April 28, 1931. A. E. FREEMAN ET AL 1,802,419
GEAR MECHANISM
Filed Nov. 22, 1929 3 Sheets-Sheet 2

INVENTORS
A. E. Freeman and
BY W. T. Livermore
ATTORNEY

April 28, 1931.  A. E. FREEMAN ET AL  1,802,419
GEAR MECHANISM
Filed Nov. 22, 1929  3 Sheets-Sheet 3

INVENTORS
A. E. Freeman and
BY W. T. Livermore
ATTORNEY

Patented Apr. 28, 1931

1,802,419

UNITED STATES PATENT OFFICE

ALBERT E. FREEMAN, OF EAST ORANGE, AND WILLIAM T. LIVERMORE, OF WESTFIELD, NEW JERSEY, ASSIGNORS TO AMERICAN TELEPHONE AND TELEGRAPH COMPANY, A CORPORATION OF NEW YORK

GEAR MECHANISM

Application filed November 22, 1929. Serial No. 409,052.

This invention relates to gear mechanism for use with motor driven vehicles, and more particularly to mechanisms of interchangeable or reversible character which are adapted to be used with a variety of types of motor driven vehicles.

Motor driven vehicles such as trucks or the like are frequently equipped with auxiliary mechanism for operating external machinery, for instance, winches or the like, which are connected to their driving shafts. Certain types of motor driven equipment require drives which are located on one side, while other types require drives located on the opposite side. The various types of trucks also have various mechanical elements, for instance, framework and supports which present obstructions to the installation of said auxiliary mechanisms unless especially manufactured for the particular type of truck with which it is to be used.

In certain classes of work, the winch or other external machinery is operated independently, and at other times the truck and winch or other auxiliary machinery are operated simultaneously. When it is not intended that this simultaneous dual operation should occur, it is extremely hazardous to have it happen accidentally.

One of the objects of this invention is to provide gearing mechanism which will permit the operation of such an auxiliary mechanism at various speeds from the main driving shaft of the motor, either separately from the vehicle drive or simultaneously with it.

A further object consists in the provision of a device of the above character of such construction that it may be applied to obtain a right or left drive by simply reversing the application of the casing to the supporting frame of a truck.

Another object of the invention is to provide spring mechanism to prevent accidental dual or simultaneous operation of the truck and external or auxiliary mechanism.

A further object consists in the provision of a compact, simple and comparatively inexpensive device of the above character.

The novel features which are considered characteristic of this invention are set forth with particularity in the appended claims. The invention itself, both as to its organization and method of operation, together with other objects and advantages thereof, will be further explained in the following detailed description having reference to the accompanying drawings consisting of the following figures:

Figure 1:
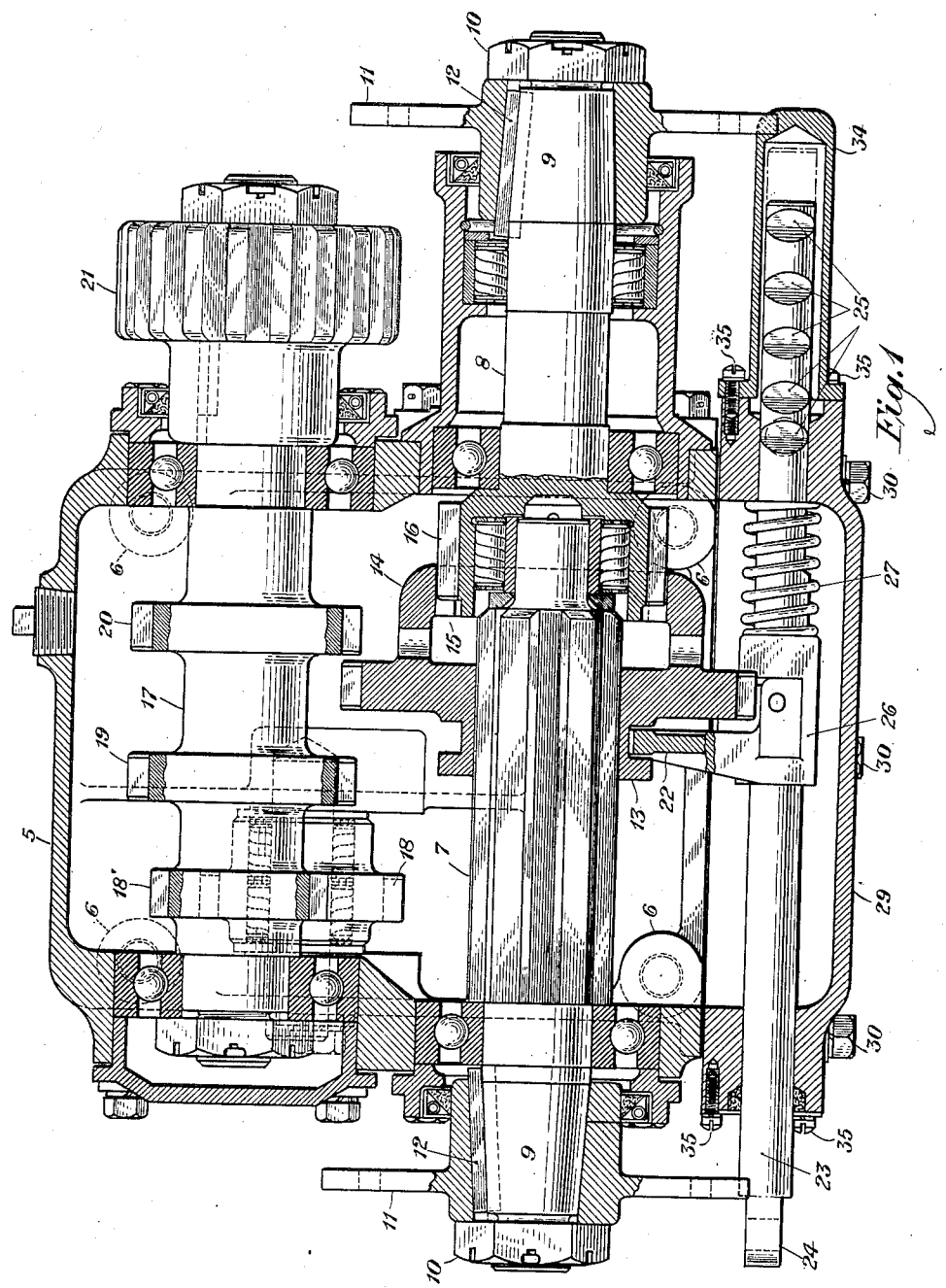
Figure 1 is a plan view in section of the improved device.

Referring to the drawing illustrating the improved device, the numeral 5 designates a transmission casing or housing in which the various elements of this invention are contained. The casing 5 may be separate from the transmission casing and be composed of several parts in any well known manner. These parts may be secured together by cap screws or the like. The casing may be secured in interchangeable positions so that its driving sprocket is at the right or left side of the chassis or other framework of the vehicle by means of bolts 6', 6' which are screwed into tapped holes provided in bosses or lugs 6, 6, which may be located at the approximate upper and lower corners of the casing.

The main driving shaft is mounted in the casing 5, as will be presently described, and is divided into two portions. These portions of the shaft comprise a forward end 7 and a rear end 8. The outer extremities of the divided portions 7 and 8 are tapered at 9, 9 and terminate in threaded portions which carry castellated nuts 10, 10. A flange 11 is secured to each of the tapered portions 9 by means of keys 12. The flange on the forward portion 7 of the driving shaft is suitably coupled to a flange on the drive shaft of a combustion engine, and the flange on the rear portion 8 of the driving shaft is coupled to a flange connected to a propeller shaft engaging with the rear end or differential of the motor driven apparatus in a well understood manner.

The driving shaft comprising the front and rear portions 7 and 8 is suitably journaled in the casing 5. The portion 7 of the driving shaft is splined and carries a movable gear 13. This gear has an annular extension 14 which is provided with internal teeth 15. These teeth engage with peripheral teeth 16 on the shaft 8, and thus provide a jaw-clutch to normally connect the shafts 7 and 8 in direct driving relation.

A counter shaft 17 is positioned in the casing 5 parallel to the divided shafts 7 and 8 of the driving shaft, and carries a series of gears consisting of a reverse gear 18′ which cooperates with an idler 18 and two forward gears 19 and 20. The counter shaft 17 is suitably journaled in the casing 5, and carries a sprocket 21 on its extended end outside the casing. This sprocket may be connected by means of a chain or the like to a winch or other external apparatus to drive it.

Figure 2:
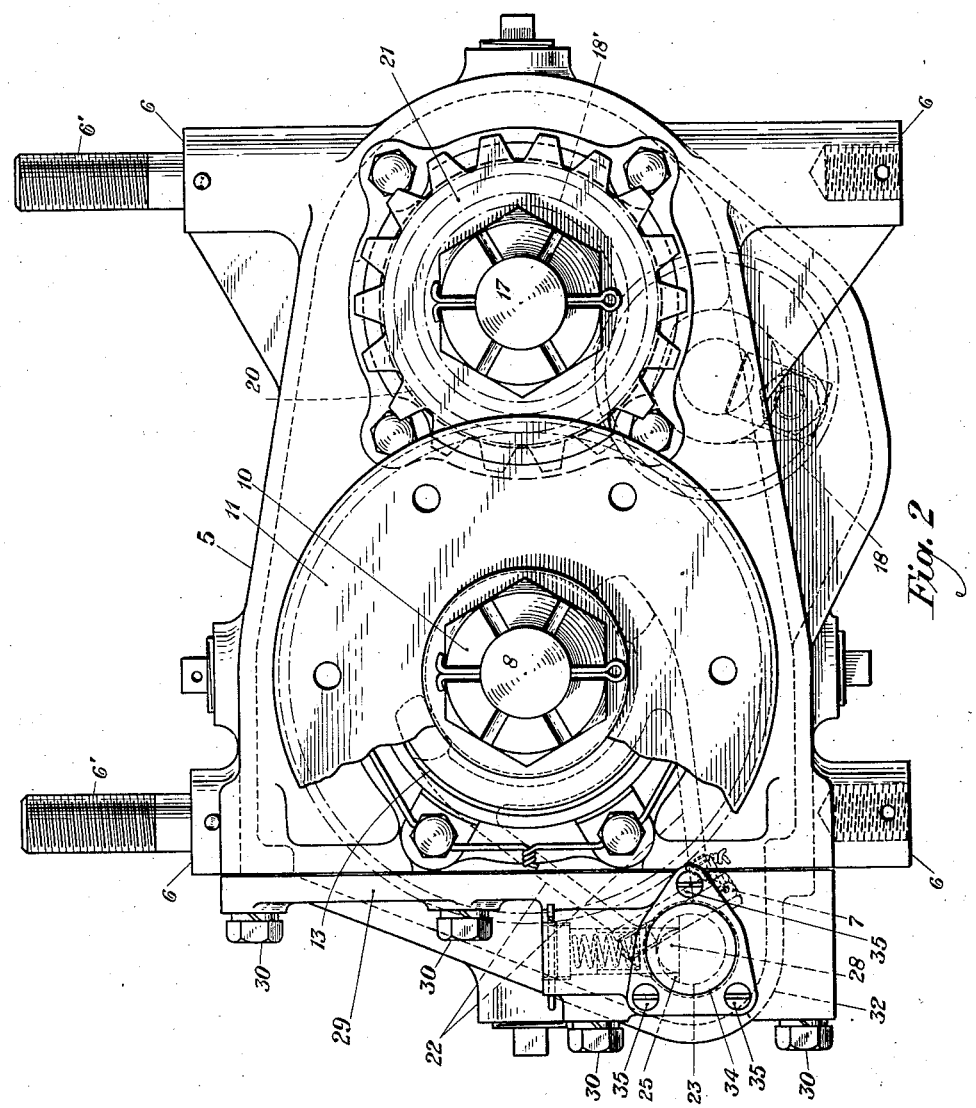
Fig. 2 is a rear end elevation, showing the position of the casing and its contained parts as applied to a truck having a left drive.
Figure 4:
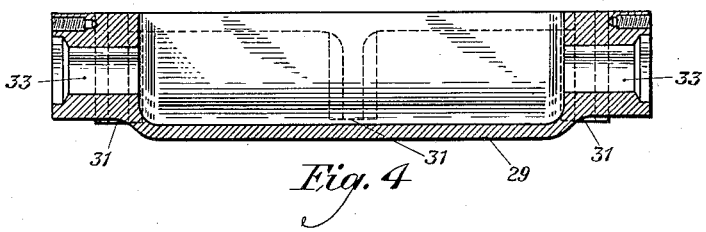
Fig. 4 is a top view in section of Fig. 3.

The casing 5 is so formed that it is substantially symmetrical with respect to a plane common to the driving shaft and counter shaft. In the rear end view of the casing, as shown in Fig. 2, the driving shaft and its sliding gear are illustrated as being positioned at the left. The driving sprocket 21 is illustrated as being located at the right. If the equipment to be mounted on the truck requires the driving sprocket to be located at the left of the truck propeller shaft, the casing and its contained elements will be rotated 180° from the position shown in Fig. 2, and applied to the truck. In other words to apply the casing and its contained elements so that the drive is on the left, we simply remove the bolts 6′, 6′ from the top bosses as shown in Fig. 2, rotate the device 180° from its position as shown in this figure, and then insert the bolts 6′, 6′ in the tapped holes appearing at the bottom of Fig. 2. The casing and its elements are thus reversed and may be applied to a truck or other motor vehicle to obtain a drive on the left side. The driving shaft and counter shaft are each provided with suitable lubricating means throughout, and are carried by the casing 6.

The movable gear 13 may be reciprocated on the shafts 7 and 8 by means of a shifter fork 22, which causes said gear to move into mesh with the various gears carried by the counter shaft 17 as may be desired. The fork 22 moves on a shifter rod 23 which is mounted in a cap plate, to be presently described, and connected at its end 24 through suitable linkage to a hand operated lever in the customary manner. The hand lever moves the shifter rod 23 to cause the engagement of the various gears of the driving shaft and counter shaft. Notches 25 are provided on said rod corresponding to all but one position, namely, the position in which the movable gear meshes with the forward gear 20 of the counter shaft to cause the dual and simultaneous operation of portion 8 of the driving shaft, and of the counter shaft, as will presently appear. The shifter rod is held in a desired position in any one of these notches by a spring actuated plunger 28, as more clearly shown in Fig. 6.

The position of the gears for which there is no notch provided on the shifter rod may be termed the dual position or that position in which the gear 20 is in mesh with the sliding gear 13 and the latter gear provides a jaw-clutch to connect the shafts 7 and 8 together. When the gears are in this position, the sprocket 21 is operated to provide a forward speed for the winch or other apparatus to which it may be connected, and the driving shaft, comprising the portions 7 and 8 is operated to provide a forward speed for the truck or the like. It will be apparent that in this position the external machinery controlled by the sprocket and the truck are both operated simultaneously.

The shifter fork 22 is connected to the cylindrical hub 26 which slides with the shifter rod 23. A helical spring 27 carried by the shifter rod has one of its ends engaging the inner circular surface of the hub 26 and the other end of said spring abuts an inner surface of the cap-plate 29 provided on the casing 5. This spring exerts pressure against the hub 26 to hold the sliding gear 13 out of mesh with the second forward speed gear 20 of the counter shaft. The sliding gear 13 can be only engaged with the gear 20 when it is intended that it should be so engaged. At such time the operating lever by which the shifter rod is manipulated must be held in this position by the operator to maintain the sliding gear engaged against the pressure exerted on its hub by the spring 27.

The cap-plate 29 which appears in detail in Figs. 3, 4, 5 and 6, provides a mounting for the shifter-rod 23. This cap-plate is attached to the side of the casing 5 by means of bolts 30, which pass through openings 31 provided in the cap-plate. The cap-plate is substantially rectangular in form and a portion 32 extends outwardly from the flat portion which engages the casing 5. The extended portion 32 has two similarly shaped portions at either of its sides in which circular openings 33 are provided for mounting the shifter rod 23. A tubular cap 34 for the extended notched end of said rod may be interchangeably secured by bolts 35 to either side of the portion 32 to provide a casing for one end of the shifter rod 23. This construction permits the shifter rod 23 to be placed in the cap-plate 29 in reversed positions.

Figure 3:
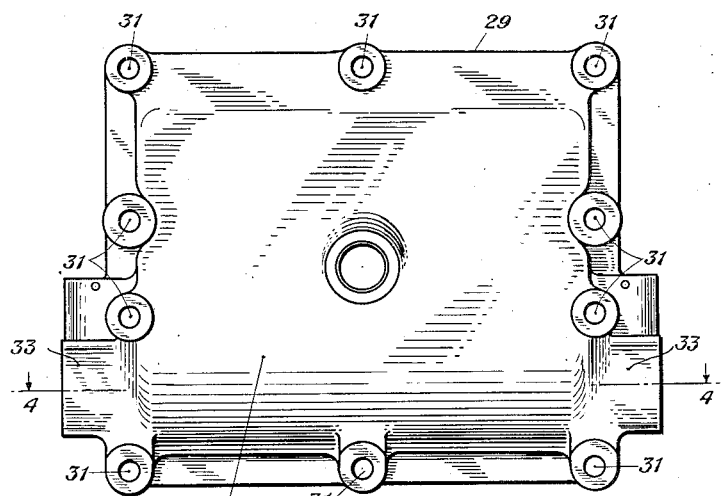
Fig. 3 is a side elevation of a cover-plate which forms a mounting for the shifter rod, and which may be applied to the casing in interchangeable positions.
Figure 5:
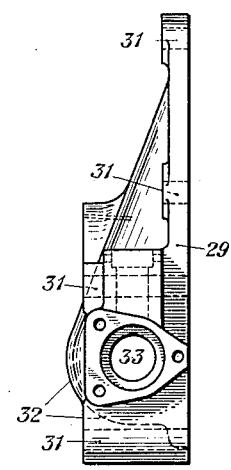
Fig. 5 is an end view of Fig. 4.
Figure 6:
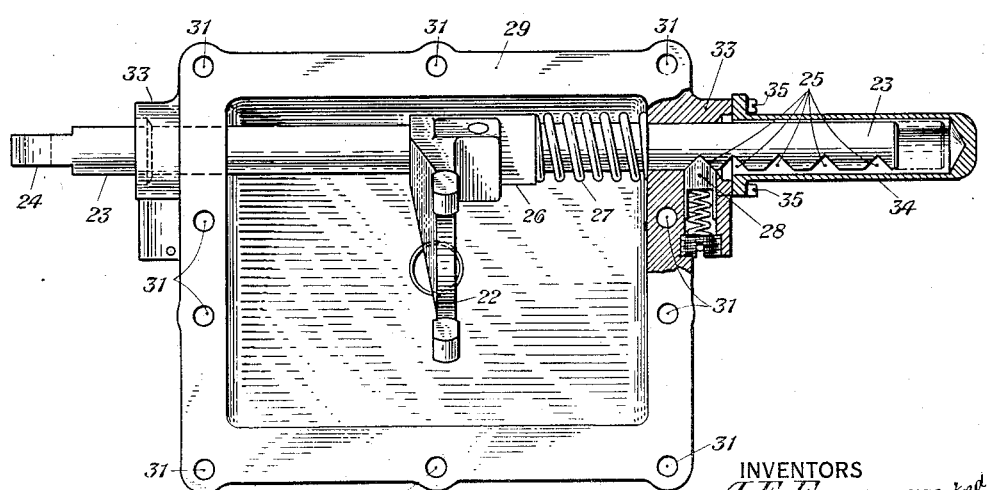
Fig. 6 is a side elevation of the interior of the cover plate showing it in a reversed position to that illustrated in Fig. 3, and with the shifter rod mounted therein.

The cap-plate 29 and its shifter mechanism may be bodily interchanged with the casing 5 and its contained elements, as previously described, from one side of the truck to the other side depending upon whether the equipment on the truck requires a right or left drive. The cap-plate 29 may be also interchangeably positioned on the casing 5 independently. That is, the cap-plate 29 may be attached in a plurality of positions to the casing 5, when the casing is positioned on a truck so as to obtain either a left drive or a right drive. Said cap-plate may be attached to the casing 5 for either drive with its shifter mechanism in a lower position, as shown in Figs. 2 and 3, or in an upper position, as shown in Fig. 6. This interchangeability of the cap-plate permits it to be attached to the casing so that the shifter rod 23 is the most convenient location for connection to the hand control lever. Should framework, support or other element of the truck present an obstruction to prevent the shifter apparatus being used when mounted in a bottom or lower position, then the cap-plate can be reversed so that the shifter apparatus will be mounted in the top or upper position. This change can be readily brought about by removing the bolts which pass through the openings 31 in the cap-plate.

The sliding gear is normally positioned between the two forward gears on the counter shaft, and in this position engages the two portions of the driving shaft in clutch connection. Power transmitted from the drive shaft which is connected by its flange to the front flange of the improved device will cause said driving shaft to be rotated in a forward direction. This causes the propeller shaft whose flange is connected to the rear flange herein illustrated to be likewise rotated to drive the truck.

When it is desired to only operate a winch or other external machinery to which the sprocket may be connected, the sliding gear is moved to engage with the front forward gear or the reverse idler gear. The movable gear in either of these positions will be removed from its clutch engagement with the rear portion of the driving shaft so that no motion will be imparted thereto to drive the truck. In case the movable gear is in engagement with the front forward driving gear, the sprocket will be rotated to cause the sprocket to rotate its connected external machinery in a forward direction. If the movable gear is in engagement with the reverse idler, said external machinery will be rotated in a reverse direction. If this external machinery should be a winch it will be driven, in the first mentioned case, in a forward direction to wind rope on its drum, and in the second mentioned case, the winch will be rotated to unwind rope from its drum. A notch on the shifter rod corresponding to the position to which the movable gear is shifted will be engaged by a spring loaded plunger to keep said gear in the desired position with either the front forward drive gear or the reverse idler gear.

If it is desired to move the sliding gear into the dual position or the position in which it engages the two portions of the driving shaft in clutch connection, and the second forward drive gear on the counter shaft to simultaneously drive the sprocket and driving shaft, the sliding gear can be only engaged in this position against the pressure exerted by the spring carried by the shifter rod. It will be also necessary at this time to manually hold the operating lever to maintain the sliding gear engaged as described because there is no notch provided on the shifter rod to hold it in this position. Therefore, should the operating lever be released, the pressure exerted by the spring will cause the sliding gear to be immediately pushed out of engagement. This makes it impossible for the operator to accidentally drive the truck and winch or other external machinery at the same time and eliminates the possibility of an accident which might be caused under these same circumstances.

The operation just described will be the same regardless of whether the casing and its contained elements is to be attached to a truck to obtain a right or left drive, and regardless of the position in which the cap plate and its shifting mechanism is attached to the casing.

While the arrangements of this invention have been illustrated as embodied in a certain specific form which has been deemed desirable, it will be understood that they are capable of embodiment in many and widely varied forms without departing from the spirit of the invention as defined in the following claims.

What is claimed is:

1. A gear mechanism comprising a support, a driving shaft, a counter shaft parallel thereto, a plurality of gears on the counter shaft, a sliding gear on the driving shaft for engaging gears on the counter shaft, and a casing for the driving shaft and counter shaft, said casing being so formed as to be substantially symmetrical with respect to a plane common to the driving shaft and counter shaft, whereby it may be reversibly mounted on the support to permit the counter shaft to assume positions on either side of the driving shaft, and a cover plate for the casing having a shift rod associated therewith so that when the casing is reversed the position of the cover plate may be reversed to permit the shift rod to be reversibly positioned with respect to the position of the casing.

2. A gear mechanism comprising a supporting frame, a driving shaft, a counter shaft parallel thereto, a plurality of gears on the counter shaft, a sliding gear on the driving shaft for engaging gears on the counter shaft, shifting means for moving said sliding gear, a casing for the driving shaft and counter shaft adapted to be reversibly mounted on the supporting frame, and a cover plate for the casing adapted to provide an interchangeable mounting for the shifting means.

3. A gear mechanism comprising a supporting frame, a driving shaft, a counter shaft parallel thereto, a plurality of gears on the counter shaft, a sliding gear on the driving shaft for engaging gears on the counter shaft, shifting means for engaging the sliding gear, a casing for the driving shaft and counter shaft, said casing being so formed as to be substantially symmetrical with respect to a plane common to the driving shaft and counter shaft whereby it may be reversibly mounted on the supporting frame to permit the counter shaft to assume positions on either side of the driving shaft, and a cover plate for the casing to provide a mounting for the shifting means in a plurality of different positions.

4. A gear mechanism comprising a supporting frame, a driving shaft, a counter shaft parallel thereto, a plurality of gears on the counter shaft, a sliding gear on the driving shaft for engaging gears on the counter shaft, shifting means for actuating said sliding gear, a casing for the driving shaft and counter shaft adapted to be reversibly mounted on the supporting frame to permit the counter shaft to assume positions on either side of the driving shaft, and a cover plate for said casing to provide a plurality of different mountings for the shifting means.

5. A gear mechanism comprising a supporting frame, a driving shaft, a counter shaft parallel thereto, a plurality of gears on the counter shaft, a sliding gear on the driving shaft for engaging gears on the counter shaft, shifting means for actuating said sliding gear, a casing for the driving shaft and counter shaft, said casing being so formed as to be substantially symmetrical with respect to a plane common to the driving shaft and counter shaft whereby it may be reversibly mounted on the supporting frame to permit the counter shaft to assume positions on either side of the driving shaft, and a cover plate for the casing adapted to be reversibly positioned thereon to provide a plurality of mountings for the shifting means.

6. A gear mechanism comprising a supporting frame, a driving shaft, a counter shaft parallel thereto, a plurality of gears on the counter shaft, a sliding gear on the driving shaft for engaging gears on the counter shaft, shifting means for actuating said sliding gear, a casing for the driving shaft and counter shaft, said casing being so formed as to be substantially symmetrical with respect to a plane common to the driving shaft and counter shaft whereby it may be reversibly mounted on the supporting frame to permit the counter shaft to assume positions on either side of the driving shaft, and a cover plate for the casing to provide a mounting for the shifting means so that when the casing is reversed the position of the cover plate may be reversed to permit the shift rod to be reversibly positioned with respect to the position of the casing.

7. A gear mechanism comprising a supporting frame, a driving shaft, a counter shaft parallel thereto, a plurality of gears on the counter shaft, a sliding gear on the driving shaft for engaging gears on the counter shaft, shifting means for moving said sliding gear, a casing for the driving shaft and counter shaft adapted to be reversibly mounted on the supporting frame, and a cover plate for the casing adapted to provide a reversible mounting for the shifting means independently of the positioning of the casing.

8. A gear mechanism for motor driven vehicles comprising a supporting frame, a driving shaft, a counter shaft parallel thereto, a plurality of gears on the counter shaft, a sliding gear on the driving shaft for engaging gears on the counter shaft, shifting means for actuating the sliding gear, a casing for the driving shaft and counter shaft, said casing being so formed as to be substantially symmetrical with respect to a plane common to the driving shaft and counter shaft whereby it may be reversibly mounted on the supporting frame to permit the counter shaft to assume positions for right or left drive on the motor vehicle, and a cover plate for the casing adapted to provide a plurality of positions in each of the reversible mountings of the casing.

9. A gear mechanism comprising a supporting frame, a driving shaft, a counter shaft parallel thereto, a plurality of gears on the counter shaft, a sliding gear on the driving shaft for engaging gears on the counter shaft, shifting means for actuating the sliding gear, a casing for the driving shaft and counter shaft adapted to be reversibly mounted on the supporting frame to permit the counter shaft to assume positions on either side of the driving shaft, and a reversible cover plate for said casing adapted to support the shifting means in two different positions with respect to the casing.

10. A gear mechanism comprising a supporting frame, a driving shaft, a counter shaft parallel thereto, a plurality of gears on the counter shaft, a sliding gear on the driving shaft for engaging gears on the counter shaft, shifting means for actuating the sliding gear, a casing for the driving shaft and counter shaft, said casing being so formed as to be substantially symmetrical with respect to a plane common to the driving shaft and counter shaft whereby it may be reversibly mounted on the supporting frame to permit the counter shaft to assume positions on either side of the driving shaft, and a cover plate for said casing adapted to support said shifting means, said casing, cover plate, and shifting means being adapted to be positioned on the supporting frame bodily, and said cover plate and shifting means being adapted to be reversibly positioned on said casing.

11. A gear mechanism comprising a supporting frame, a driving shaft comprising two alined portions, a counter shaft parallel thereto, a plurality of gears on the counter shaft, a sliding gear on the driving shaft for connecting its two portions and for engaging gears on the counter shaft, shifting means for actuating the sliding gear, means associated with the shifting means to prevent the accidental simultaneous engagement of the two portions of the driving shaft and one of the gears on the counter shaft, a casing for said shafts and gears, and a cover plate for the casing forming a mounting for the shifting means, said cover plate being adapted to be reversibly mounted on said casing.

12. A gear mechanism comprising a supporting frame, a driving shaft comprising two alined portions, a counter shaft parallel thereto, a plurality of gears on the counter shaft, a sliding gear on the driving shaft for connecting its two portions in direct driving relation and for engaging the gears on the counter shaft, shifting means for the movable gear, tension means associated with the shifting means to only permit the simultaneous engagement of the movable gear with the two portions of the driving shaft and one of the gears on the counter shaft when said shifting means is moved and manually held against the pressure exerted by said tension means, a casing for said shafts and associated elements, and a cover plate for the casing forming a mounting for the shifting means, said casing being adapted to be reversibly mounted on the supporting frame, and said cover plate being movable with the casing or independently reversible thereon.

13. A gear mechanism comprising a supporting frame, a driving shaft comprising two alined portions, a counter shaft parallel thereto, a plurality of gears on the counter shaft comprising a reverse gear and two forward gears, a movable gear on the driving shaft connecting its two portions in jaw clutch engagement and adapted to be connected to each of the gears on the counter shaft, said movable gear being adapted to engage one of said forward gears and the two portions of said driving shaft to simultaneously drive the counter shaft and driving shaft, tension means for providing pressure to prevent the accidental shifting of the movable gear to the latter position, a casing for said shafts and associated elements, and a cover plate for the casing forming a mounting for the shifting means, said casing being adapted to be reversibly mounted on the supporting frame, and said cover plate being movable with the casing or independently reversible thereon.

14. A gear mechanism, in combination, a casing, a driving shaft comprising two alined portions, a counter shaft parallel thereto, a plurality of gears on the counter shaft, a sliding gear on the driving shaft for connecting its two portions and for engaging gears on the counter shaft, and means associated with the movable gear to prevent its accidental simultaneous engagement with the two portions of the driving shaft and one of the gears on the counter shaft.

15. In gearing, in combination, a driving shaft comprising two alined portions, a counter shaft parallel thereto, a plurality of gears on the counter shaft comprising a reverse gear and two forward gears, a movable gear on the driving shaft connecting its two portions in jaw clutch engagement in one position and adapted to be connected to the reverse gear and one of the forward gears on the counter shaft independently of the rear portion in other positions, said movable gear being also adapted to engage one of said forward gears and the two portions of said driving shaft in another position to simultaneously drive the counter shaft and driving shaft, and tension means for only permitting the shifting of the movable gear to its latter position while pressure is exerted on said tension means.

16. In gearing, in combination, a driving shaft comprising two alined portions, a counter shaft parallel thereto, a plurality of gears on the counter shaft, a movable gear on the driving shaft for connecting its portions in jaw clutch engagement, and adapted in certain positions to be connected independently of one of the driving shaft portions to certain of the gears on the counter shaft, and in another position to be connected to one of the gears on the counter shaft and the two portions of the driving shaft simultaneously, shifting means for said movable gear, and a compression spring associated with the shifting means for only permitting the simultaneous engagement of the movable gear with two portions of the driving shaft when pressure is exerted to hold the shifting means against the compression of said spring.

17. A gear mechanism comprising a support, a driving shaft, a counter shaft parallel thereto, a plurality of gears on the counter shaft, a sliding gear on the driving shaft for engaging gears on the counter shaft, shifting means for actuating said sliding gear, a casing for the driving shaft and counter shaft and a cover plate for the casing adapted to be reversibly positioned thereon to provide a plurality of mountings for the shifting means.

18. A gear mechanism comprising a support, a driving shaft, a counter shaft parallel thereto, a plurality of gears on the counter shaft, a sliding gear on the driving shaft for engaging gears on the counter shaft, shifting means for actuating the sliding gear, a casing for the driving shaft and counter shaft, and a reversible cover plate for said casing adapted to support the shifting means in either of two alternative positions with respect to the casing.

In testimony whereof, we have signed our names to this specification this 20th day of November, 1929.

ALBERT E. FREEMAN.
WILLIAM T. LIVERMORE.